United States Patent Office 3,314,854
Patented Apr. 18, 1967

3,314,854
21-HETEROCYCLIC CARBOXYLIC ACID ESTERS OF PREGNANES
Joachim Heider and Dietrich Jerchel, Biberach an der Riss, Germany, assignors to Boehringer Ingelheim G.m.b.H., Ingelheim am Rhine, Germany, a corporation of Germany
No Drawing. Filed Nov. 3, 1964, Ser. No. 408,660
Claims priority, application Germany, Aug. 19, 1961, T 20,620
18 Claims. (Cl. 167—65)

ABSTRACT OF THE DISCLOSURE

The invention relates to novel 21-heterocyclic carboxylic acid esters of pregnanes which possess high anti-inflammatory activity and a lower hypophysial inhibiting activity.

This application is a continuation-in-part of our United States patent application No. 216,738, filed August 14, 1962, now abandoned.

The invention relates to novel 21-carboxylic acid esters of steroids having the formula:

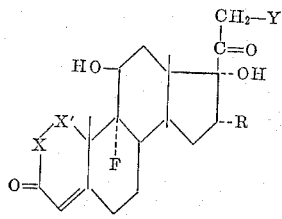

wherein X and X' form a radical selected from the group consisting of ethylene and vinylene, R is selected from the group consisting of hydrogen and methyl and together with the 17-hydroxyl group forms the radical

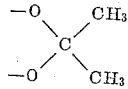

and Y is selected from the group consisting of pyridine-2, 3- and 4-carbonyloxy radicals and pyridine-2,3 and 4-acetoxy radicals. The invention also relates to compositions having a high anti-inflammatory activity and to a method of inhibiting inflammation.

Corticosteroids such as hydrocortisone and prednisolone as well as their $9\alpha$-fluoro derivatives and simple 21-esters thereof possess a strong anti-inflammatory activity as well as mineralocorticoid and glucocorticoid activity and may be administered internally or externally. The compounds of Formula I of the invention possess a greater anti-inflammatory activity than the corresponding free steroid alcohols or their simple carboxylic acid esters and surprisingly possess a lower hypophysis inhibiting activity than the said steroid alcohols and simple esters thereof. All prior art steroid derivatives which possess a greater anti-inflammatory activity than the original steroid also possess a greater hypophysis inhibiting activity.

It is an object of the invention to provide the novel compounds of Formula I.

It is another object of the invention to provide novel compositions having a high anti-inflammatory activity.

It is a further object of the invention to provide a novel method of inhibiting inflammation.

These and other objects and advantages of the invention will become obvious from the following detailed description.

The novel compounds of the invention have the formula:

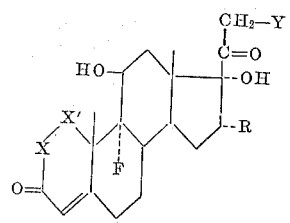

wherein X and X' form a radical selected from the group consisting of ethylene and vinylene, R is selected from the group consisting of hydrogen and methyl and together with the 17-hydroxyl group forms the radical and Y is selected from the group consisting of pyridine-2, 3- and 4-carbonyloxy radicals and pyridine-2,3 and 4-acetoxy radicals.

The novel esters of the invention may be prepared by the usual esterification processes. The corresponding 21-halo-corticosteroids may be reacted with a salt of the desired pyridine carboxylic acid at elevated temperatures or preferably by reacting the free corticosteroid alcohol with the acid halide of the desired pyridine carboxylic acid in the presence of a solvent such as pyridine and dimethyl-formamide at temperatures of 0 to 90° C. Other methods include reacting the free corticosteroid alcohol with the desired pyridine carboxylic acid anhydride in the presence of pyridine or with the desired pyridine carboxylic acid in the presence of phosphorous oxychloride as a water-binding agent.

The novel compositions of the invention having a high-anti-inflammatory activity are comprised of a carboxylic acid ester of Formula I and a pharmaceutical carrier. The compositions may be used in the form of injectable solutions or suspensions, tablets, suppositories, pomades, tinctures and lotions prepared by the usual known processes.

The method of the invention for inhibiting inflammation comprises administering daily an effective amount of a carboxylic acid ester of Formula I. The said carboxylic acid ester may be administered orally, transcutaneously or by application on the skin. The usual useful single dose is 0.2 to 1.0 mg., preferably 0.5 mg., and the usual useful daily dose when used internally is 0.5 to 3.0 mg., preferably 1.5 mg., and when used topically on the skin the concentration of the product may be 0.005 to 0.5%, preferably 0.2%, by weight of the composition.

The lower hypophysis inhibiting activity of the claimed compounds is biologically significant because the hypophysis controls the production of corticosteroids in the body. When hypophysis is inhibited to a large extent, the production of corticosteroids by the body may be inhibited so much that the body will no longer produce corticosteroids after cessation of administration of corticosteroids. This naturally has grave biological consequences. The esters of Formula I have surprisingly greater anti-inflammatory activity with a lower hypophysis inhibiting activity than the free steroid alcohols.

In the following examples there are described several preferred embodiments to illustrate the invention. However, it should be understood that the invention is not intended to be limited to the specific embodiments.

EXAMPLE I

*21-(pyridine-3-carbonyloxy)-9α-fluoro-16α-methyl-Δ$^{1,4}$-pregnadiene-11β,17α-diol-3,20-dione*

0.5 gm. of 9α-fluoro-16α-methyl-Δ$^{1,4}$-pregnadiene-11β, 17α-diol-3,20-dione dissolved in 2.5 cc. of pyridine and 0.2 gm. of pyridine-3-carboxylic acid chloride dissolved in 1.5 cc. of dimethylformamide were combined with stirring and the mixture was kept at 45° C. for 10 hours. The reaction mixture was then poured into a mixture consisting of 30 cc. of concentrated hydrochloric acid, 40 cc. of water and 80 cc. of acetone and 0.54 gm. (84% of theory) of 21-(pyridine-3-carbonyloxy)-9α-fluoro-16α-methyl-Δ$^{1,4}$-pregnadiene-11β,17α-diol-3,20-dione having a melting point of 253 to 257° C. and a specific rotation $[α]_D^{27}=+114.5°$ (dioxane) was obtained.

EXAMPLE II

*21-(pyridine-4-carbonyloxy)-9α-fluoro-16α-methyl-Δ$^{1,4}$-pregnadiene-11β,17α-diol-3,20-dione*

Using the procedure of Example I, 0.5 gm. of 9α-fluoro-16α-methyl-Δ$^{1,4}$-pregnadiene-11β,17α,21-triol-3,20-dione (dexamethasone) dissolved in 2.5 cc. of pyridine was reacted with 0.2 gm. of pyridine-4-carboxylic acid chloride dissolved in 1.5 cc. of dimethylformamide to obtain 0.54 gm. (85% of theory) of 21-(pyridine-4-carbonyloxy)-9α-fluoro-16α-methyl-Δ$^{1,4}$-pregnadiene-11β,17α-diol-3,20-dione having a melting point of 250–252° C. and a specific rotation $[α]_D^{27}=+193.5°$ (dioxane).

EXAMPLE III

*21-(pyridine-2-carbonyloxy)-9α-fluoro-Δ$^4$-pregnene-11β,17α-diol-3,20-dione*

500 mg. of 9α-fluoro-Δ$^4$-pregnene-11β,17α,21-triol-3,20-dione and 1 gm. of pyrridyl-2-carboxylic acid were dissolved in 4 cc. of pyridine, and while stirring this mixture phosphorus oxychloride was added dropwise at room temperature. After allowing the reaction mixture to stand for 50 hours at 25° C., the reaction solution was poured into a mixture of water and hydrochloric acid and the mixture was then neutralized with a sodium bicarbonate solution. After extraction with ethyl acetate, concentrating the extract by evaporation, taking up the residue in ethanol and repeating the precipitation with water, the product was recrystallized from ethanol/water to give 80 mg. of 21-(pyridine-2-carbonyloxy)-9α-fluoro-Δ$^4$-pregnene-11β,17α-diol-3,20-dione having a melting point of 250° C. and a specific rotation $[α]_D^{26}=+183°$ (methanol).

EXAMPLE IV

*21-(pyridine-3-carbonyloxy)-9α-fluoro-Δ$^4$-pregnene-11β,17α-diol-3,20-dione*

0.5 gm. of 9α-fluoro-Δ$^4$-pregnene-11β,17α,21-triol-3,20-dione was added together with 0.9 gm. pyridine-3-carboxylic acid anhydride to 2.5 cc. of pyridine and the mixture was heated for 2 hours on a steam bath. After pouring the reaction solution into 15 cc. of water and neutralizing the same with a sodium bicarbonate solution, the oily precipitate which separated out was stirred and separated by vacuum filtration and was recrystallized in aqueous alcohol. 440 mg. (70% of theory) of 21-(pyridine-3-carbonyloxy)-9α-fluoro-Δ$^4$-pregnene-11β,17α-diol-3,20-dione having a melting point of 253° C. and a specific rotation $[α]_D^{22}=+181.5°$ (methanol) were obtained.

EXAMPLE V

*21-(pyridine-4-carbonyloxy)-9-fluoro-Δ$^4$-pregnene-11β,17α-diol-3,20-dione*

Using the procedure of Example IV, 0.3 gm. of 9α-fluoro-Δ$^4$-pregnene-11β,17α,21-triol-3,20-dione and 0.6 gm. of pyridine-4-carboxylic acid anhydride dissolved in 3 cc. of pyridine were reacted for 1½ hours to obtain 0.32 gm. (84% of theory) of 21-(pyridine-4-carbonyloxy)-9α-fluoro-Δ$^4$-pregnene-11β,17α-diol-3,20-dione having a melting point of 233.5 to 234.5° C. and a specific rotation $[α]_D^{22}=+181.5°$ (methanol).

EXAMPLE VI

*21 - (pyridine - 3 - acetoxy) - 9α - fluoro - Δ$^4$ - pregnene-11β,17α-diol-3,20-dione*

0.35 gm. of 9α-fluoro-21-iodo-Δ$^4$-pregnene-11β,17α-diol-3,20-dione dissolved in 5 cc. of methanol and 0.2 gm. of potassium salt of pyridine-3-acetic acid dissolved in 30 cc. of acetone were refluxed for 2.5 hours. After concentration of the reaction solution by evaporation and admixing the residue with ice water, a precipitate formed which was recrystallized from a mixture of ethanol and water to obtain 100 mg. of 21-(pyridine-3-acetoxy)-9α-fluoro-Δ$^4$-pregnene-11β,17α-diol-3,20-dione having a melting point of 159–161° C. and a specific rotation $[α]_D^{25}=+131.5°$ (methanol).

EXAMPLE VII

*21 - (pyridine - 2 - carbonyloxy) - 9α - fluoro-16α-methyl-Δ$^{1,4}$-pregnadiene-11β,17α-diol-3,20-dione*

Using the process of Example III, 500 mg. of 9α-fluoro-16α-methyl-Δ$^{1,4}$-pregnadiene - 11β,17α,21 - triol-3,20-dione and 1 gm. of pyridine-2-carboxylic acid dissolved in 4 cc. of pyridine were mixed with phosphorous oxychloride dropwise to obtain 180 mg. (28.5% of theory) of 21 - (pyridine- 2 - carbonyloxy)-9α-fluoro-16α-methyl-Δ$^{1,4}$-pregnadiene-11β,17α-diol-3,20-dione having a melting point of 255.5° C. and a specific rotation $[α]_D^{21}=+148°$ (methanol).

EXAMPLE VIII

*21 - (pyridine - 3 - acetoxy) - 9α - fluoro - 16α - methyl-Δ$^{1,4}$-pregnadiene-11β,17α-diol-3,20-dione*

Using the process of Example III, 500 mg. of 9α-fluoro-16α - methyl - Δ$^{1,4}$ - pregnadiene - 11β,17α,21 - triol - 3,20-dione and 1 gm. of pyridine-3-acetic acid in 6 cc. of pyridine were mixed with 0.2 cc. of thionyl chloride to obtain 100 mg. of 21-(pyridine-3-acetoxy)-9α-fluoro-16α-methyl-Δ$^{1,4}$-pregnadiene-11β,17α-diol-3,20-dione having a melting point of 199° C. and a specific rotation $[α]_D^{25}=+36.6°$ (methanol).

EXAMPLE IX

*The 16,17-acetonide of 21-(pyridine-3-carbonyloxy)-9α-fluoro - Δ$^{1,4}$ - pregnadiene - 11β,16α,17α - triol- 3,20-dione*

300 mg. of the 16,17-acetonide of 9α-fluoro-Δ$^{1,4}$-pregnadiene-11β,16α,17α-triol-3,20-dione and 135 mg. of the hydrochloride of pyridine-3-carboxylic acid chloride were dissolved in 4 cc. of pyridine and the reaction mixture was held at 50° C. for 20 hours. The reaction solution was poured into 100 cc. of ice water to form a precipitate which was recrystallized from a mixture of methanol and water. 225 mg. (60% of theory) of the 16,17-acetonide of 21-(pyridine - 3 - carbonyloxy) - 9α - fluoro - Δ$^{1,4}$-pregnadiene-11β,16α,17α-triol-3,20-dione having a melting point of 225° C. were obtained.

EXAMPLE X

*The 16,17-acetonide of 21-(pyridine-4-carbonyloxy)-9α-fluoro-Δ$^{1,4}$-pregnadiene-11β,16α,17α-triol-3,20-dione*

300 mg. of the 16,17-acetonide of 9α-fluoro-Δ$^{1,4}$-pregnadiene-11β,16α,17α-triol-3,20-dione and 135 mg. of the hydrochloride of pyridine-4-carboxylic acid chloride were reacted according to the process of Example IX to obtain 340 mg. of the acetonide of 21-(pyridine-4-carbonyloxy)-9α - fluoro - Δ$^{1,4}$ - pregnadiene - 11β,16α,17α-triol-3,20-dione having a melting point of 245–246° C.

EXTERNAL PHARMACEUTICAL COMPOSITIONS

A. *Oil (water-in-oil emulsion)*.—5.0 gm. of glycerin monostearate, 30.0 gm. of wool grease and 35.0 gm. of vaseline were melted together and the molten mixture was heated to 70° C. 0.1 gm. of methyl p-hydroxybenzoate was dissolved in 29.88 gm. of distilled water at 80° C. and after cooling the resulting solution to 70° C., the solution was emulsified into the warm melt at 70° C. The resulting emulsion was cooled to 40° C. and 0.02 gm. of micronized 21-(pyridine-4-carbonyloxy)-9α-fluoro-16α-methyl-$\Delta^{1,4}$-pregnadiene-11β,17α-diol-3,20-dione (Example II) was uniformly dispersed through the emulsion by stirring and the mixture was stirred until cold.

B. *Cream (oil-in-water emulsion).*—5.0 gm. of isopropyl myristate, 5.0 gm. of cetyl alcohol, 6.0 gm. of glycerin monostearate and 4.0 gm. of polyoxyethylene-sorbitol monostearate (Tween 60) were melted together and the melt was then emulsified into an aqueous solution of 0.1 gm. of methyl p-hydroxybenzoate in 79.88 gm. of water at 70° C. The resulting cream was cooled to 40° C. and 0.02 gm. of micronized 21-(pyridine-4-carbonyloxy)-9α-fluoro-16α-methyl-$\Delta^{1,4}$-pregnadiene-11β,17α-diol-3,20-dione was uniformly distributed therethrough with an immersion homogenizer. The cream was then stirred until cold and was then rolled.

C. *Tincture.*—0.02 gm. of 21-(pyridine-4-carbonyloxy)-9α-fluoro-16α-methyl-$\Delta^{1,4}$-pregnadiene-11β,17α-diol-3,20-dione and 0.5 gm. of hexachlorophene were dissolved in 65.0 gm. of ethyl alcohol with stirring. While still stirring, 0.2 gm. of Perfume 2422 (Martens) and 34.28 gm. of water were added and the resulting solution was filtered until free from fibers.

D. *Lotion.*—2.5 gm. of cetylstearyl alcohol (Lanette N) and 2.0 gm. of isopropyl myristate were melted together and then heated to 70° C. The melt was then emulsified at 70° C. into a solution of 0.1 gm. of methyl p-hydroxybenzoate and 4.0 gm. of glycerin dissolved in 91.38 gm. of distilled water. The emulsion was stirred until cold and then 0.02 gm. of micronized 21-(pyridine-4-carbonyloxy)-9α-fluoro-16α-methyl $\Delta^{1,4}$-pregnadiene-11β,17α-diol-3,20-dione was uniformly distributed therethrough with an immersion homogenizer.

E. *Aerosol spray.*—0.02 gm. of 21-(pyridine-4-carbonyloxy)-9α-fluoro-16α-methyl-$\Delta^{1,4}$-pregnadiene-11β,17α-diol-3,20-dione was dissolved with stirring in a mixture of 30.0 gm. of ethyl alcohol and 38.38 gm. of isopropyl alcohol and to this solution were added 0.1 gm. of Perfume 2422 (Martens) and 1.5 gm. of isopropyl myristate. The resulting solution was admixed with 30 gm. of difluorodichloromethane and the mixture was packed in aerosol pressure cans by cooled or pressure filling methods.

F. *Suspension.*—First 0.2 gm. of sodium benzoate and then 0.2 gm. of carboxymethyl cellulose (highly viscous) were dissolved in 87.33 gm. of distilled water. Then 10.0 gm. of glycerin, 0.75 gm. of polyoxyethylene-sorbitol mono-oleate (Tween 80), 1.5 gm. of finely divided salicylic acid and 0.02 gm. of 21-(pyridine-4-carbonyloxy)-9α-fluoro-16α-methyl-$\Delta^{1,4}$-pregnadiene-11β,17α-diol-3,20-dione were stirred in the solution. The resulting suspension was homogenized and freed from air with a vacuum.

Similar compositions have been prepared with the products of Examples I and III to X with the same concentration of active ingredient.

PHARMACOLOGICAL DATA

A. *Glucocorticoid activity.*—The glucocorticoid activity of the pyridine-4-carboxylic acid ester of dexamethasone-21 was compared to dexamethasone and its acetic acid ester and succinic acid ester. Groups of male rats having an average beginning weight of 80 gm. and having been fasting for 24 hours received a single equimolar intramuscular dose of one of the said compounds. The compounds were administered as microcrystalline suspensions in a water-alcohol mixture (10 vol.: 1 vol.) in a volume of 0.5 ml./100 gm. of the animal. Using the method of Porter et al. (Endocrinology, vol. 53, 1953, p. 73), the overall activity (reaction integral) obtained after a single dose was determined. The difference between the average glycogen values of the steroid treated rats and those of control rats which received only the solvent was determined at 24-hour intervals after the treatment. The sum of the mean values for the glycogen accumulation as compared to the control animals for the individual days until the end of the activity served as the approximation value for the reaction integral. The results are summarized in Table I.

TABLE I.—GLUCOCORTICOID ACTIVITY DETERMINED ON MALE RATS

| Active Substance | Dose in mg./kg. | Increase of liver glycogen compared to controls in mg. glycogen/gm. of liver | | | | | | | Overall Activity | Duration of Effect in Days | Relative Effect |
|---|---|---|---|---|---|---|---|---|---|---|---|
| | | 24 hr. | 48 hr. | 72 hr. | 96 hr. | 120 hr. | 144 hr. | 168 hr. | | | |
| Dexamethasone | 8.00 | 25.71 n=31 s=10.4 | 22.57 n=26 s=17.2 | 14.10 n=13 s=15.7 | −0.87 n=20 s=0.83 | | | | 62.4 | 3 | 1.0 |
| Pyridine-4-carboxylic acid ester of dexamethasone-21 | 10.16 | 22.34 n=22 s=7.5 | 56.02 n=19 s=16.5 | 43.14 n=20 s=9.8 | 26.28 n=22 s=12.6 | 0.80 n=12 s=1.7 | 0.52 n=9 s=1.5 | | 149.1 | 6 | 2.39 |
| Acetic acid ester of dexamethasone-21 | 8.86 | 26.17 n=18 s=5.3 | 46.47 n=18 s=14.5 | 26.45 n=17 s=16.1 | 20.97 n=18 s=12.4 | 4.00 n=18 s=7.9 | 2.27 n=12 s=8.2 | −0.11 n=12 s=1.4 | 126.3 | 6 | 2.02 |
| Succinic acid ester of dexamethasone-21 | 10.37 | 15.45 n=17 s=9.2 | 13.15 n=18 s=12.3 | 2.06 n=18 s=8.8 | −0.42 n=17 s=5.4 | | | | 30.66 | 3 | 0.49 | n = number of rats in group.   s = average deviation.

The results of Table I show that the succinic acid ester has only 49% of the glucocorticoid activity of dexamethasone and the acetic acid ester possesses only 202% of the activity of dexamethasone while the pyridine-4-carboxylic acid ester of dexamethasone possesses 239% of the glucocorticoid activity of dexamethasone. In other words, the acetic acid ester is only 84.7% as effective as the pyridine-4-carboxylic acid ester of dexamethasone while the succinic acid ester is only 20.6% as effective.

B. *Anti-inflammatory activity.*—The anti-inflammatory activity of the same steroids was determined using the anti-exudative activity against the albuminous edema of rats' hindlegs. By provoking edema at various periods after the administration of the compounds being tested, points on a curve were obtained whose integral expressed the overall activity of the said products at equimolar doses.

A subplanter injection of 0.1 ml. of a 10% albuminous solution in 0.85% sodium chloride solution effected the release of edema using the method of Wilhelmi et al. (Research for Medicines, vol. 1, 1951, p. 151). The increase in swelling of the leg was measured according to Doepfer et al. (Int. Allergy, vol. 12, 1958, p. 89) by measuring the sagittal diameter of the paw with a measuring gauge. Groups of rats received a single subcutaneous injection of the active products as microcrystalline suspensions in a solution of 10% ethanol in 0.9% sodium chloride solution. The release of the edema was effected at 3, 7, 23, 47, 95, 119 and 143 hours after the administration of the active products and the increase in swelling of the paw was determined one hour later. The data is summarized in Table II.

TABLE II.—ANTI-EXUDATIVE EFFECT

| Compound Tested | Dosage in mg./kg. | Percent Reduction in Swelling as Compared With Controls Hours After Administration | | | | | | | | Reaction Integral Overall percent X hour Arresting Effect |
|---|---|---|---|---|---|---|---|---|---|---|
| | | 4 | 8 | 24 | 48 | 72 | 96 | 120 | 144 | |
| Dexamethasone | 1.00 | n=12 34.3 | n=10 27.8 | n=13 11.7 | n=15 0 | | | | | 649 |
| Pyridine-4-carboxylic acid ester of of dexamethasone. | 1.27 | | n=12 22.2 | n=13 43.1 | n=10 64.3 | n=13 55.6 | n=12 37.0 | n=14 2.1 | n=15 0 | 4,944 |
| Acetic acid ester of dexamethasone. | 1.11 | n=15 0 | n=15 5.0 | n=15 21.7 | n=15 34.5 | n=14 22.6 | n=15 8.0 | n=15 0 | | 2,054 |
| Succinic acid ester of dexamethasone. | 1.30 | n=20 24.0 | n=15 38.0 | n=15 28.3 | n=15 25.2 | n=15 18.8 | n=15 9.1 | n=15 0 | | 2,316 |

Table II shows that the anti-inflammatory of dexamethasone and its acetic acid and succinic acid ester are only 13.1, 41.5 and 46.8%, respectively, of the anti-inflammatory activity of the pyridine-4-carboxylic acid ester of dexamethasone.

C. *Hypophysis inhibiting activity.*—The hypophysis inhibiting activity was determined by the adrenal cortex-involution shown by the decrease in adrenal weight in rats. Groups of ten healthy male rats having an average beginning weight of 75 to 80 gm. received four doses of the test compounds over a period of 14 days. The compounds were administered intramuscularly as microcrystalline suspension in 10% ethanol in 0.9% sodium chloride solution. The control animals received the same volume of the solvent. After 14 days, the rats were killed and the moist weight of the adrenal glands was immediately determined. The percentage differences in weight of the adrenal glands of the animals as compared to the control animals shows the hypophysis inhibiting activity of the test compounds and the results are reported in Table III.

TABLE III

| Compound | Dosage,[1] γ/kg. | Percent Reduction of the Adrenal Glands Compared to Controls |
|---|---|---|
| 21-(pyridine-4-carbonyloxy)-9α-fluoro-16α-methyl-Δ$^{1,4}$-pregnadiene-11β,17α-diol-3,20-dione. | 30 60 120 | 31 32 61 |
| 9α-fluoro-16α-methyl-Δ$^{1,4}$-pregnadiene-11β,17α,21-triol-3,20-dione. | 30 60 120 | 28 65 74 |

[1] The ester was administered at dosages calculated as the free alcohol.

Table III shows that at low dosages (30γ/kg. daily), the hypophysis inhibiting activity of the ester and the alcohol are not materially different but at higher dosages, the 21-(pyridine-4-carbonyloxy)-ester has a significantly lower hypophysis inhibiting activity as compared to the free alcohol as can be seen by the lesser effect on the adrenal glands.

D. *Acute toxicity.*—The acute toxicity was determined on groups of 10 male mice having an average beginning weight of 18 to 20 gm. 21-(pyridine-4-carbonyloxy)-9α-fluoro-16α-methyl-Δ$^{1,4}$-pregnadiene-11β,17α-diol-3,20-dione in a 1% Tylose solution was administered intraperitoneally at varying dosages with a constant volume of 0.4 ml. per 20 gm. of weight of the mice. The mice were kept under observation for seven days and the LD$_{50}$ of the said ester was 442 mg./kg. determined by the method of Litchfield and Wilcoxan.

Various modifications of the compositions of the invention may be made without departing from the spirit or scope thereof and it is to be understood that the invention is to be limited only as defined in the appended claims.

We claim:
1. A compound of the formula:

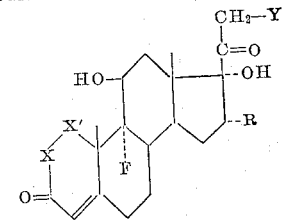

wherein X and X' form a radical selected from the group consisting of ethylene and vinylene, R is selected from the group consisting of hydrogen and methyl and together with the 17-hydroxyl group forms the radical

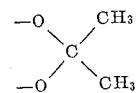

and Y is selected from the group consisting of pyridine-2,3- and 4-carbonyloxy and pyridine-2,3 and 4-acetoxy.

2. A compound of the formula:

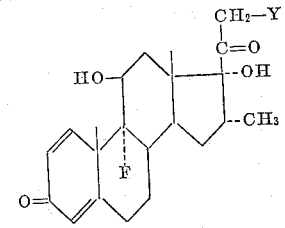

wherein Y is selected from the group consisting of pyridine-2,3 and 4-carbonyloxy and pyridine-2,3 and 4-acetoxy.

3. A compound of the formula:

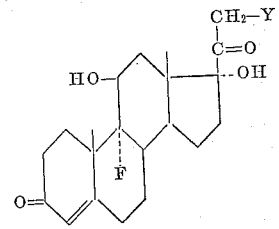

wherein Y is selected from the group consisting of pyridine-2,3 and 4-carbonyloxy and pyridine-2,3 and 4-acetoxy.

4. A compound of the formula:

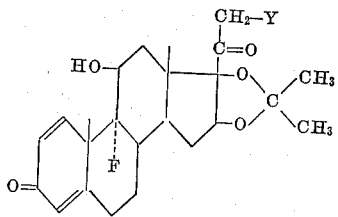

wherein Y is selected from the group consisting of pyridine-2,3 and 4-carbonyloxy and pyridine-2,3 and 4-acetoxy.

5. 21 - (pyridine - 3 - carbonyloxy) - 9α - fluoro - 16α-methyl-Δ$^{1,4}$-pregnadiene-11β,17α-diol-3,20-dione.
6. 21 - (pyridine - 4 - carbonyloxy) - 9α - fluoro - 16α-methyl-Δ$^{1,4}$-pregnadiene-11β,17α-diol-3,20-dione.
7. 21 - (pyridine - 2 - carbonyloxy) - 9α - fluoro - 16α methyl-Δ$^{1,4}$-pregnadiene-11β,17α-diol-3,20-dione.
8. 21 - (pyridine - 3 - acetoxy) - 9α - fluoro - 16α methyl-Δ$^{1,4}$-pregnadiene-11β,17α-diol-3,20-dione.
9. The 16,17-acetonide of 21-(pyridine-3-carbonyloxy)-9α-fluoro-Δ$^{1,4}$-pregnadiene-11β,16α,17α-triol-3,20-dione.
10. The 16,17-acetonide of 21-(pyridine-4-carbonyloxy) - 9α-fluoro-Δ$^{1,4}$-pregnadiene-11β,16α,17α-triol-3,20-dione.
11. 21 - (pyridine - 2 - carbonyloxy) - 9α - fluoro-Δ$^4$-pregnene-11β,17α-diol-3,20-dione.
12. 21 - (pyridine - 3 - carbonyloxy) - 9α - fluoro-Δ$^4$-pregnene-11β,17α-diol-3,20-dione.
13. 21 - (pyridine - 4 - carbonyloxy) - 9α - fluoro - Δ$^4$-pregnene-11β,17α-diol-3,20-dione.
14. 21 - (pyridine - 3 - acetoxy) - 9α - fluoro - Δ$^4$-pregnene-11β,17α-diol-3,20-dione.
15. A composition having a high anti-infllammatory activity and a reduced hypophysis inhibiting activity comprising a carboxylic acid ester of the formula:

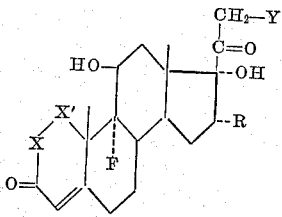

wherein X and X' form a radical selected from the group consisting of ethylene and vinylene, R is selected from the group consisting of hydrogen and methyl and together with the 17-hydroxyl group forms the radical

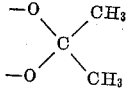

and Y is selected from the group consisting of pyridine-2, 3 and 4-carbonyloxy radicals and pyridine-2,3 and 4-acetoxy radicals and a pharmaceutical carrier.

16. The composition of claim 15 wherein the said ester is 21 - (pyridine - 4 - carbonyloxy)-9α-fluoro-16α,methyl-Δ$^{1,4}$-pregnadiene-11β,17α-diol-3,20-dione.

17. A method for inhibiting inflammation which comprises administering daily an effective amount of a carboxylic acid ester of the formula:

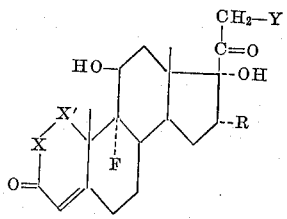

wherein X and X' form a radical selected from the groups consisting of ethylene and vinylene, R is selected from the group consisting of hydrogen and methyl and together with the 17-hydroxyl group forms the radical

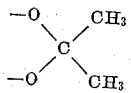

and Y is selected from the group consisting of pyridine-2, 3 and 4-carbonyloxy radicals and pyridine-2,3 and 4-acetoxy radicals.

18. The method of claim 17 wherein the said ester is 21 - (pyridine - 4 - carbonyloxy) - 9α - fluoro - 16α-methyl-Δ$^{1,4}$-pregnadiene-11β,17α-diol-3,20-dione.

References Cited by the Examiner

UNITED STATES PATENTS

| | | | |
|---|---|---|---|
| 2,865,935 | 12/1958 | Schneider et al. | 260—397.45 |
| 3,013,033 | 12/1961 | Mussbaum et al. | 260—397.45 |
| 3,033,748 | 5/1962 | Wettstein et al. | 167—65 |
| 3,054,810 | 9/1962 | Leeson et al. | 260—397.45 |
| 3,055,922 | 9/1962 | Levinson | 260—397.45 |

OTHER REFERENCES

Fieser et al.: Steroids, p. 683 and 691 (1959), Reinhold Pub. Co., N.Y.

LEWIS GOTTS, *Primary Examiner.*

HENRY A. FRENCH, *Assistant Examiner.*